US009691202B2

(12) United States Patent
Schuster

(10) Patent No.: US 9,691,202 B2
(45) Date of Patent: Jun. 27, 2017

(54) INPUTTING LOCK COMMANDS

(71) Applicant: Inventio AG, Hergiswil (CH)

(72) Inventor: Kilian Schuster, Emmenbrücke (CH)

(73) Assignee: Inventio AG, Hergiswil (CH)

( * ) Notice: Subject to any disclaimer, the term of this patent is extended or adjusted under 35 U.S.C. 154(b) by 59 days.

(21) Appl. No.: 14/422,009

(22) PCT Filed: Jul. 19, 2013

(86) PCT No.: PCT/EP2013/065304
§ 371 (c)(1),
(2) Date: Feb. 17, 2015

(87) PCT Pub. No.: WO2014/032854
PCT Pub. Date: Mar. 6, 2014

(65) Prior Publication Data

US 2015/0221148 A1 Aug. 6, 2015

(30) Foreign Application Priority Data

Aug. 31, 2012 (EP) .................................... 12182606

(51) Int. Cl.

*G05B 19/00* (2006.01)
*G05B 23/00* (2006.01)
*G06F 7/00* (2006.01)
*G06F 7/04* (2006.01)
*G07C 9/00* (2006.01)

(52) U.S. Cl.

CPC ...... *G07C 9/00111* (2013.01); *G07C 9/00007* (2013.01); *G07C 9/00309* (2013.01); *G07C 9/00658* (2013.01); *G07C 2009/00277* (2013.01); *G07C 2009/00769* (2013.01); *G07C 2209/62* (2013.01); *G07C 2209/63* (2013.01)

(58) Field of Classification Search

CPC ........... G07C 2009/00277; G07C 2009/00769; G07C 2209/62; G07C 2209/63; G07C 9/00007; G07C 9/00111; G07C 9/00309; G07C 9/00658

USPC ......................................................... 340/5.61

See application file for complete search history.

(56) References Cited

U.S. PATENT DOCUMENTS

| | | | | |
|---|---|---|---|---|
| 4,979,594 | A | 12/1990 | Begle et al. | |
| 5,929,769 | A | 7/1999 | Garnault | |
| 7,446,644 | B2 * | 11/2008 | Schaffzin ........... | G07C 9/00182 340/5.6 |
| 7,664,464 | B2 * | 2/2010 | Gerstenkorn ...... | G07C 9/00309 187/380 |

(Continued)

FOREIGN PATENT DOCUMENTS

| | | | |
|---|---|---|---|
| EP | 1283503 | A2 | 12/2003 |
| EP | 1970265 | A2 | 9/2008 |

(Continued)

OTHER PUBLICATIONS

PCT/EP2013/065304, Written Opinion of the International Search Authority, Feb. 28, 2015.*

*Primary Examiner* — Nader Bolourchi
(74) *Attorney, Agent, or Firm* — Shumaker Loop & Kendrick; William J. Clemens

(57) ABSTRACT

A command can be input into an electronic lock by holding a data carrier in range of a reader of the lock. The lock provides an indicator for one or more commands. An indicated command can be selected using the data carrier.

16 Claims, 8 Drawing Sheets

(56) References Cited

U.S. PATENT DOCUMENTS

| | | | |
|---|---|---|---|
| 2011/0100762 A1 | 5/2011 | Gerstenkorn et al. | |
| 2012/0031711 A1 | 2/2012 | Gerstenkorn et al. | |
| 2012/0037458 A1* | 2/2012 | Gerstenkorn | B66B 1/468 187/247 |
| 2012/0234058 A1* | 9/2012 | Neil | G07C 9/00571 70/91 |

FOREIGN PATENT DOCUMENTS

| | | |
|---|---|---|
| WO | 2010000332 A1 | 1/2010 |
| WO | 2010066866 A1 | 6/2010 |

* cited by examiner

INPUTTING LOCK COMMANDS

FIELD

The disclosure relates to electronic locks.

BACKGROUND

Electronic locks can often receive one or more commands from a user. For example, a user can press a button to activate or deactivate the lock.

US20110100762A1 describes a system with command buttons on, for example, a door trim. The command buttons can initiate commands for actions within a system.

SUMMARY

In various embodiments, a command can be input into an electronic lock by holding a data carrier in range of a reader of the lock. The lock provides an indicator for one or more commands. An indicated command can be selected by a given gesture, for example, by removing the data carrier from the range of the reader.

In some embodiments, an electronic lock method comprises: detecting a first presence of a data carrier using a data-carrier reader of an electronic lock; communicating an indicator for a first command using an output device of the electronic lock; detecting a second presence of the data carrier using the data-carrier reader; communicating an indicator for a second command using the output device; detecting a confirmation of the data carrier with the data-carrier reader; and as a result of detecting the confirmation of the data carrier, selecting the second command with a computer-based control unit of the electronic lock. The confirmation of the data carrier can comprise an absence of the data carrier, or a continued presence of the data carrier. The data carrier can comprise a radio-frequency identification tag or an optical code. The second command can be an elevator installation command, an access control system command, or a command for a lock portion. The indicator for the first command can comprise an icon or a sound.

In further embodiments, an electronic lock comprises a data-carrier, an output device, and a computer-based control unit coupled to the data-carrier reader and to the output device, the computer-based control unit being programmed to perform a method, the method comprising, detecting a first presence of a data carrier using the data-carrier reader, communicating an indicator for a first electronic lock command using the output device, detecting a second presence of the data carrier using the data-carrier reader, communicating an indicator for a second electronic lock command using the output device, detecting a confirmation of the data carrier with the data-carrier reader, and as a result of detecting the confirmation of the data carrier, selecting the second electronic lock command. The control unit can also be coupled to an elevator system, an access control system and/or a lock portion.

Further embodiments comprise a computer-based device configured to perform one or more of the disclosed methods.

At least some embodiments of the disclosed methods can be implemented using a computer or computer-based device that performs one or more method acts, the computer or computer-based device having read instructions for performing the method acts from one or more computer-readable storage media. The computer-readable storage media can comprise, for example, one or more optical disks, volatile memory components (such as dynamic random-access memory (DRAM) or static random-access memory (SRAM) and/or nonvolatile memory components (such as hard drives, Flash random-access memory (RAM) or read-only memory (ROM)). The computer-readable storage media do not cover pure transitory signals. The methods disclosed herein are not performed solely in the human mind.

DETAILED DESCRIPTION

Figure 1:
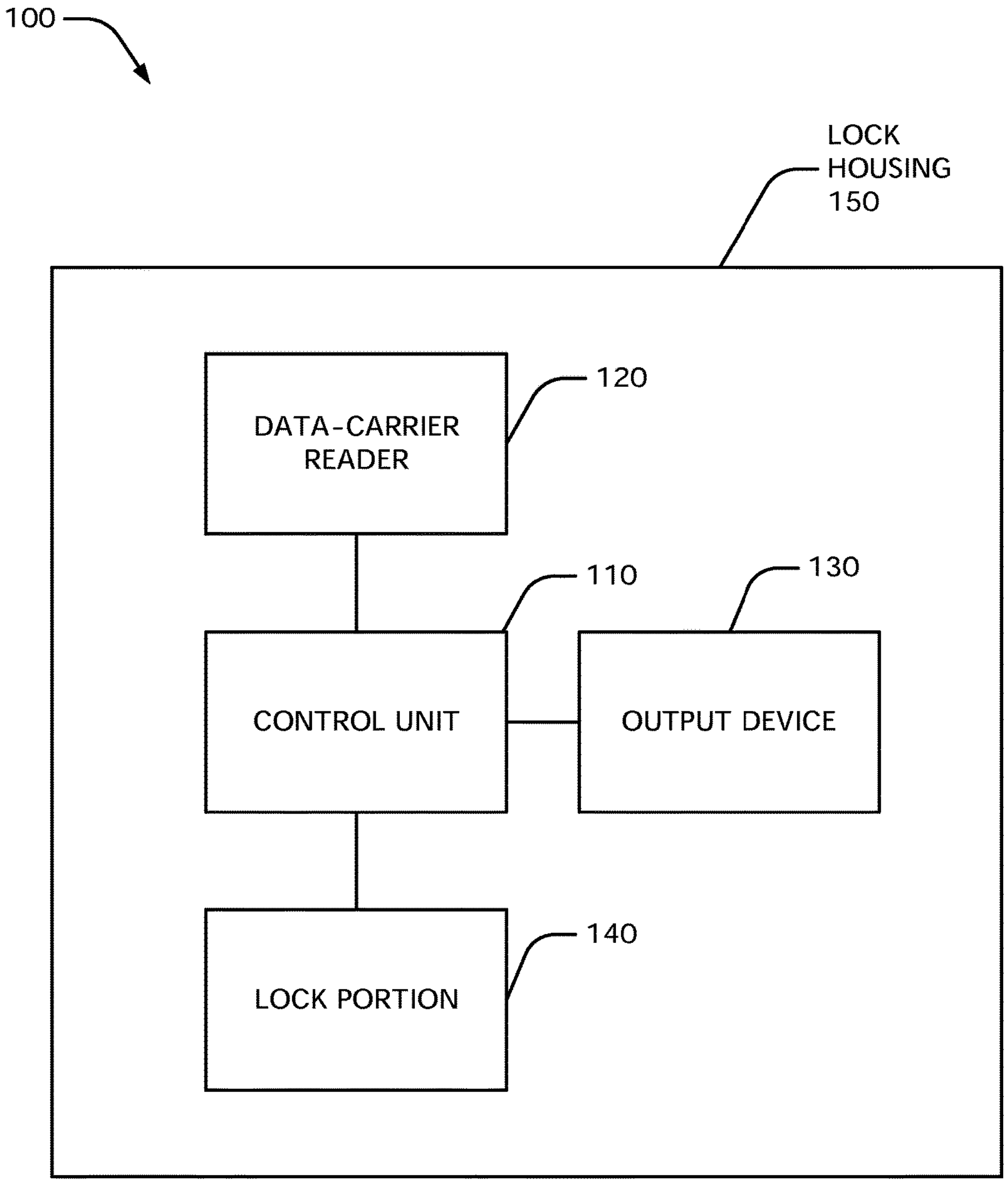
FIG. 1 shows a block diagram of an exemplary embodiment of an electronic lock system.

FIG. 1 shows a block diagram of an exemplary embodiment of an electronic lock system 100. The lock system 100 comprises a control unit 110, which is coupled to a data-carrier reader 120 and an output device 130. In further embodiments, the lock system also includes a lock portion 140, which is coupled to the control unit 110. The control unit 110 is a computer-based device comprising a processor and a computer-readable storage medium. The computer-readable storage medium contains instructions that, when executed by the processor, cause the control unit 110 to perform one or more method acts described herein. The data-carrier reader 120 is designed to detect the presence of a data carrier and read information from the data carrier. In some embodiments, the reader 120 is a radio-frequency identification (RFID) reader. In further embodiments, the reader 120 is a near-field communication (NFC) reader or a far-field communication reader. In other embodiments, the reader 120 comprises an optical code reader. The output device 130 can visually and/or audibly communicate information to a user. In various embodiments, the output device 130 comprises, for example: one or more LEDs (light-emitting diodes); one or more LCDs (liquid-crystal displays); one or more LCD display panels; a speaker; and/or one or more light bulbs. The lock portion 140 can comprise, for example, a lock component that engages or disengages with a door frame or other component to allow a door to be opened or closed.

In some cases, one or more components of the system 100 are communicatively coupled by a network (not shown) to additional components.

In particular embodiments, at least some of the components of the lock system 100 are contained in a lock housing 150. The lock housing 150 can, for example, be positioned in or on a door that is locked or unlocked by the lock system 100. The lock housing 150 can also be positioned remotely from the door, or near (but outside of) the door.

Figure 2:
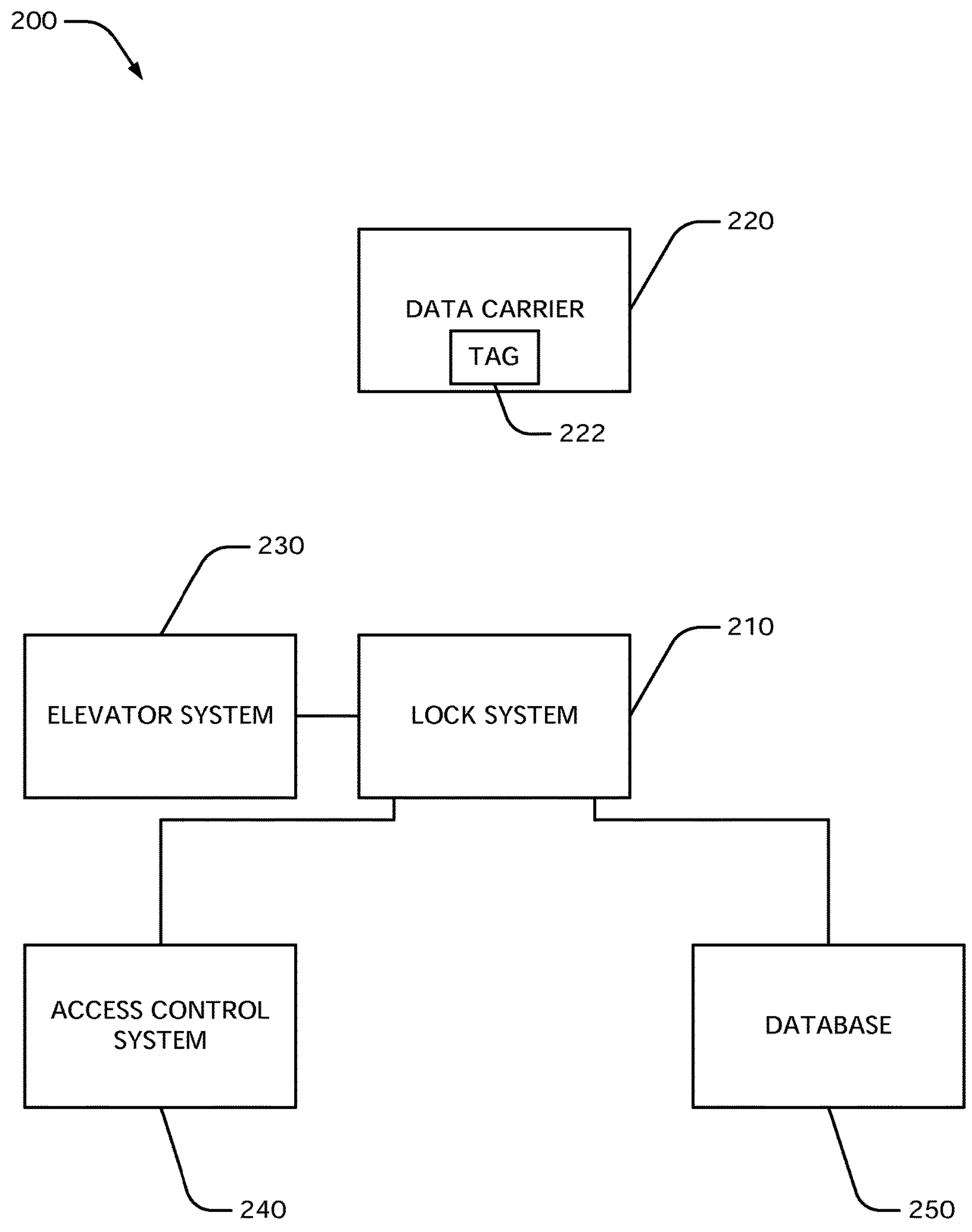
FIG. 2 shows a block diagram of an exemplary embodiment of a lock system environment.

FIG. 2 shows a block diagram of an exemplary embodiment of a lock system environment 200. The lock system environment 200 comprises a lock system 210, which can be an embodiment of the system 100 described in FIG. 1. The lock system 210 detects and reads information from one or more data carriers 220. The data carrier 220 comprises a tag 222, for example, an RFID tag or other radio-based device. The tag 222 can also comprise an optical code (e.g.: a one-dimensional code, such as a bar code; a two-dimensional code, such as a Quick Response (OR) code; or another machine-readable image). The data carrier 220 can have the form of a card, the form of a key fob, or another form. In some embodiments, the data carrier 220 comprises a portable electronic device, such as an NFC-enabled device operating in card-emulation mode.

In various embodiments, the lock system 210 can be coupled to an elevator system 230, to an access control system 240, and/or to another system. The lock system 210 can also be coupled to a database 250. The database 250 can store information about, for example, users, user permissions, access times for areas of a building and/or other types of information.

Figure 3:
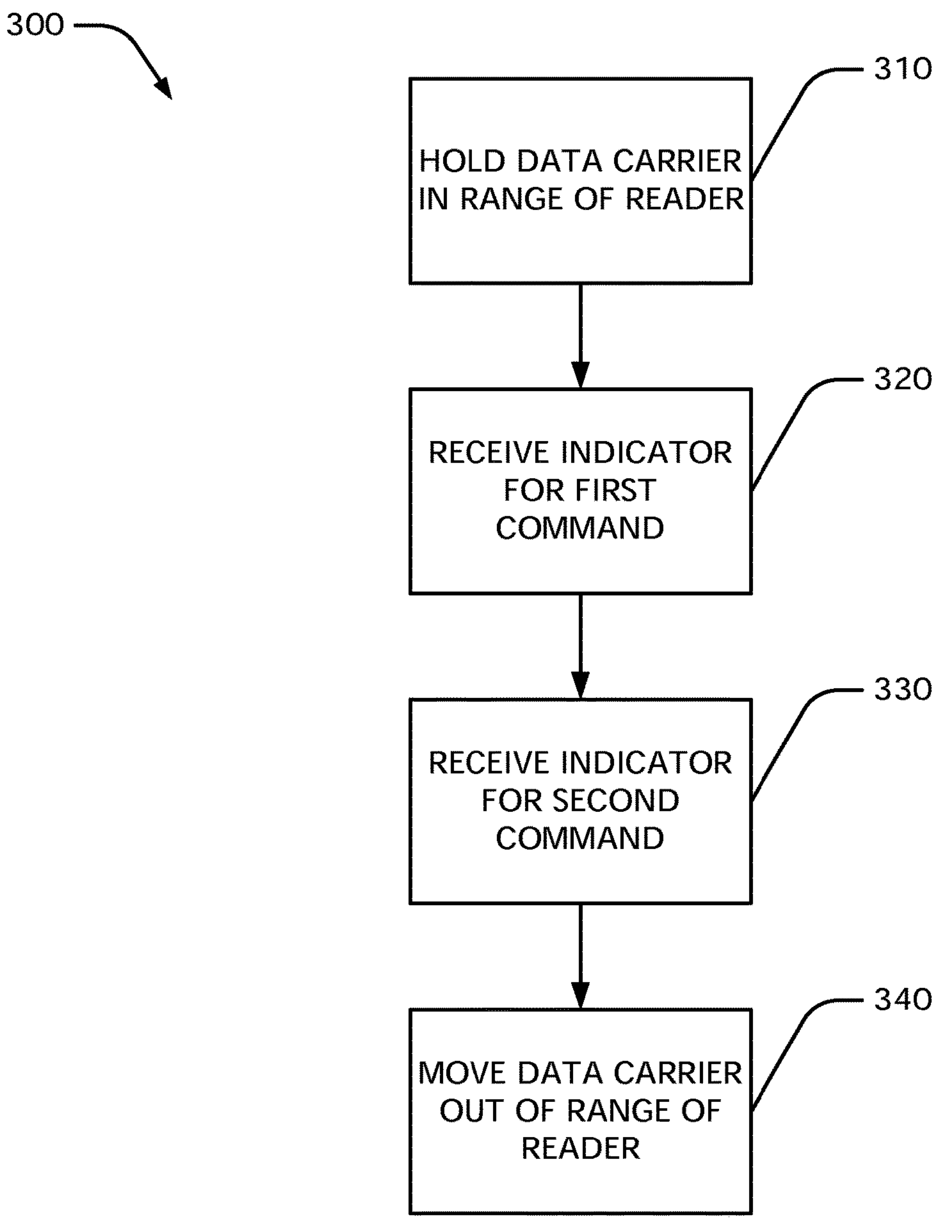
FIG. 3 shows a flow diagram of an exemplary embodiment of a method for inputting lock commands.

FIG. 3 shows a flow diagram of an exemplary embodiment of a method 300 for inputting lock commands. In a method step or act 310, a user holds a data carrier in range of a reader of a lock system (e.g., the lock system 100, described above). The phrase "in range of" the reader means that the data carrier is close enough to the reader for the reader to recognize the presence of the data carrier and read information from it. The range can vary according to the embodiment. Possible ranges include, for example, a few millimeters, a few centimeters, less than 1 meter, about 1 meter, 3 meters, 5 meters, 10 meters, or another distance. In a method act 320, the user receives an indicator of a first command from the output device of the lock system.

Generally, such an indicator can be a visual indicator, such as a graphic, an icon, an animation, a color, a number and/or text. The indicator can also be a sound, such as a tone, a voice, a click, music or another sound. In some cases, the indicator is a combination of a visual indicator and a sound.

If the user wishes to select the first command, then the user can move the data carrier outside of the range of the reader. The lock system would then interpret this action as selection of the first command. However, if the user wishes to select another command, the user can leave the data carrier in range of the reader. Then, in a method act 330, the user receives an indicator for a second command from the output device of the lock system. In a method act 340, the user moves the data carrier out of range of the reader to show that the user wishes to select the second command.

In various embodiments, different numbers of commands are available for selection by the user. For example, the lock system could offer two, three, four, five, ten or another number of commands. In some cases, once the lock system has communicated an indicator for the last of the commands, the system can repeat the indicators for the commands until the user selects a command. Thus, the user can "cycle through" the available commands.

How long a data carrier must remain within range of a reader (after the reader displays a command) to cause the reader to display a next indicator can vary by embodiment. In some cases, the amount of time is, for example, 0.5 seconds, 1 second, 2 seconds, 3 seconds, or another amount of time.

Figures 4A, 4B, 4C:
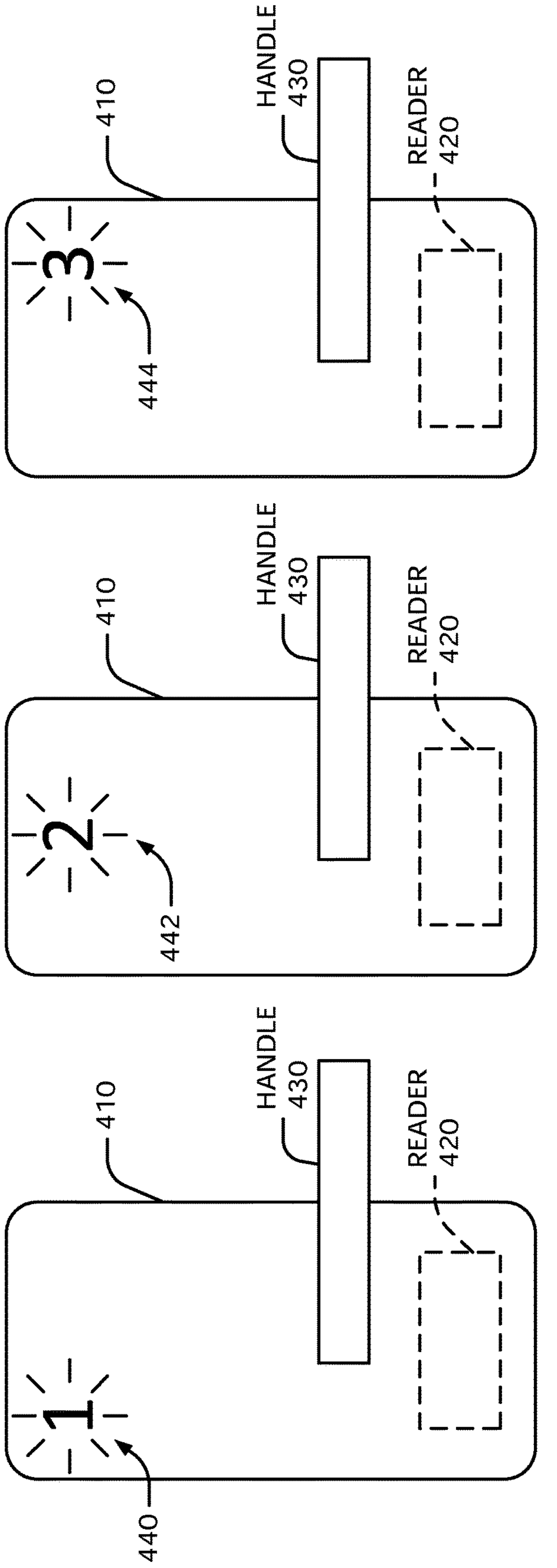
FIGS. 4A-4C show exemplary embodiments of a lock system that communicates indicators for several commands.

FIGS. 4A-4C show exemplary embodiments of a lock system that communicates indicators for several commands. The lock system, including a reader 420, is at least partially contained in a lock housing 410. A handle 430 is coupled to the lock housing 410. In FIG. 4A, an indicator 440 for a first command is displayed as a "1" on the upper surface of the lock housing 410. In FIG. 4B, an indicator 442 for a second command is displayed as a "2" on the upper surface of the lock housing 410. In FIG. 4C, an indicator 444 for a third command is displayed as a "3" on the upper surface of the lock housing 410.

The commands that can be input by the user vary according to the particular embodiment. Possible commands include, for example: lock a door; unlock a door; call an elevator to pick up the user; open a door for a visitor; send an elevator to pick up a visitor; and/or other commands.

Figure 5:
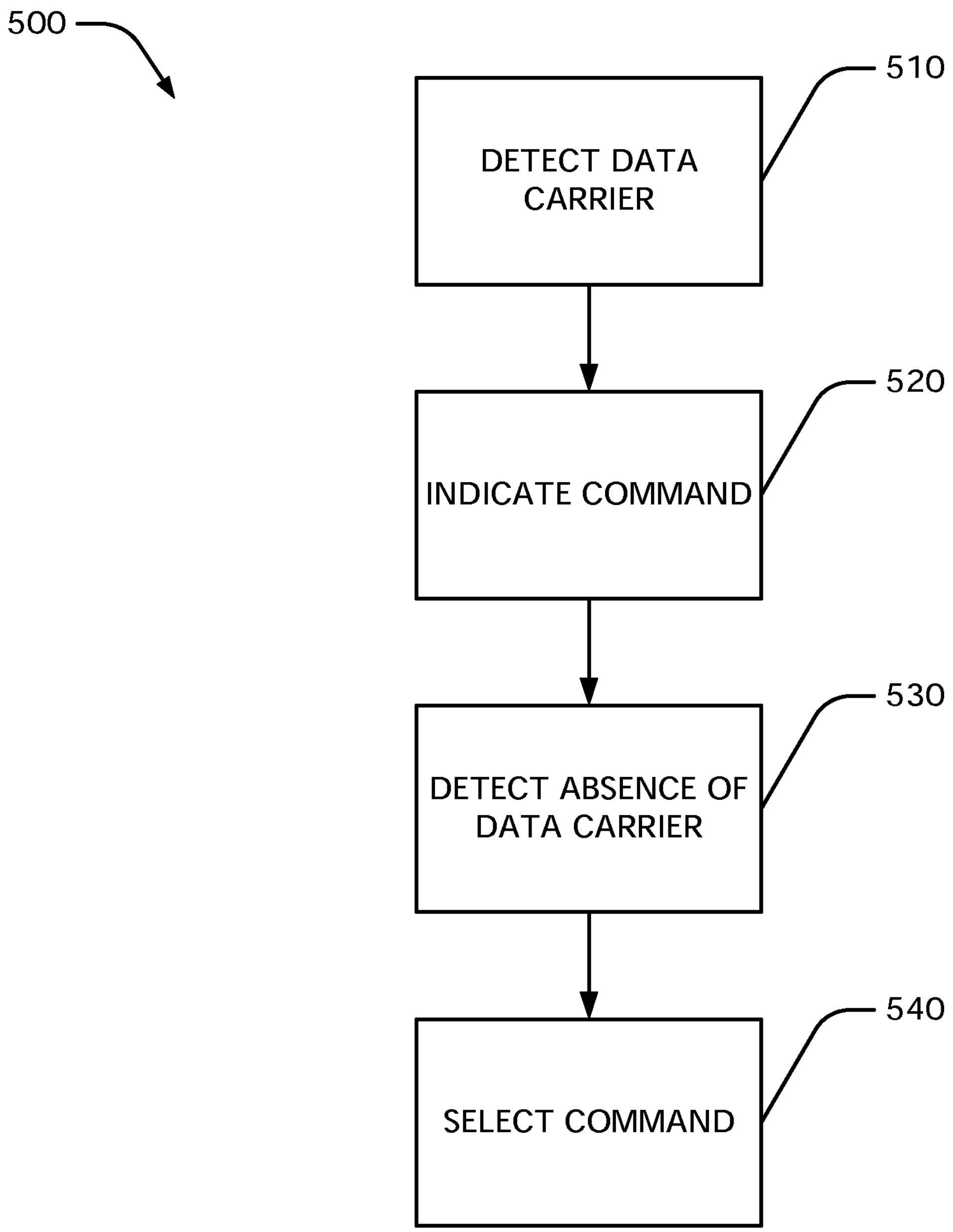
FIG. 5 shows a flow diagram of an exemplary embodiment of a method for inputting lock commands.

FIG. 5 shows a flow diagram of an exemplary embodiment of a method 500 for inputting lock commands. Compared to the method 300, the method 500 is generally from the point of view of the lock system. The method 500 can be performed using, for example, an embodiment of the lock system 100.

In a method step or act 510, the lock system detects a data carrier using the data-carrier reader. As a result of detecting the presence of the data carrier, the lock system indicates a command using the lock output device in a method act 520. In a method act 530, the lock system detects the absence of the data carrier using the reader. As a result of no longer detecting the data carrier, the lock system selects the indicated command in a method act 540.

In further embodiments of the method 500, the lock system also sends the selected command to another system. For example, if the selected command is an elevator command (e.g., call the elevator), the lock system sends the command to the elevator system. If the selected command is an access control command (e.g., unlock a door for a visitor), the lock system sends the command to the access control system.

Figure 6:
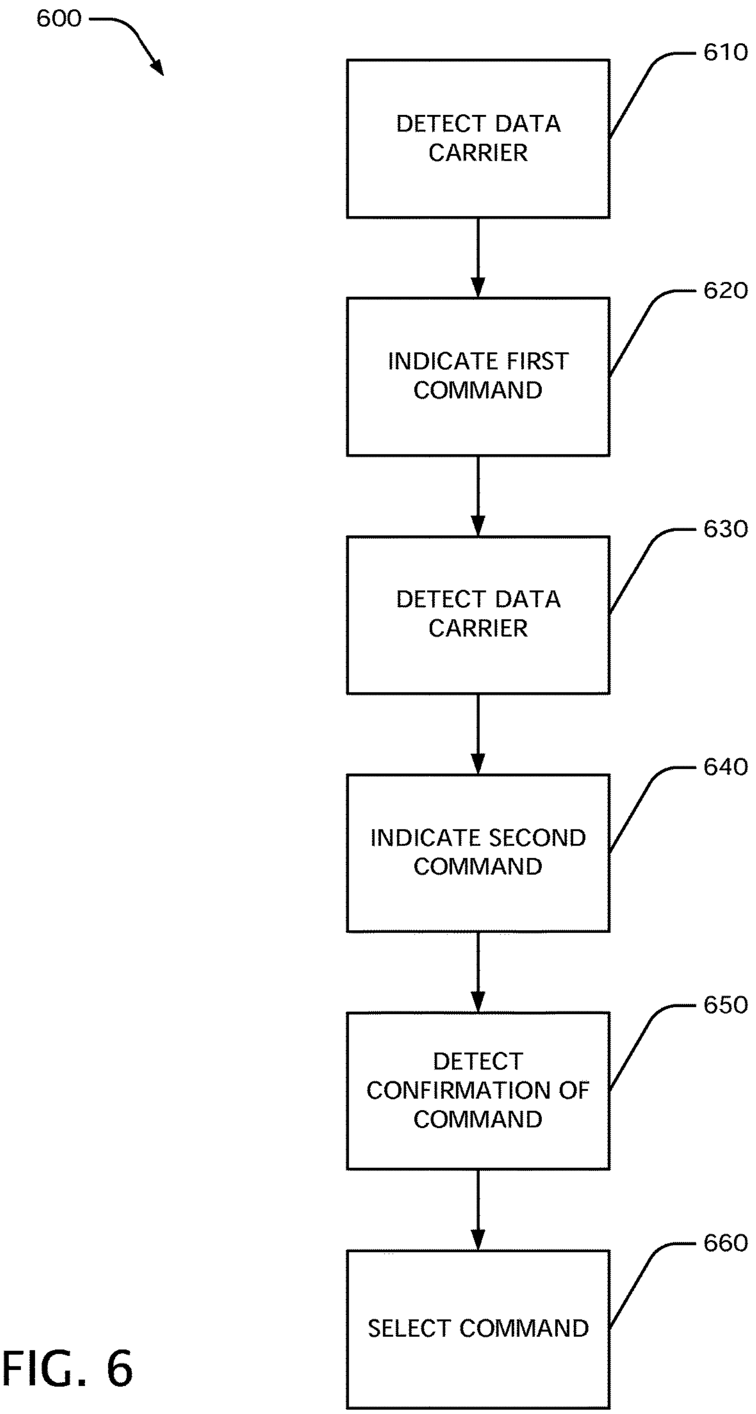
FIG. 6 shows a flow diagram of an exemplary embodiment of another method for inputting lock commands.

FIG. 6 shows a flow diagram of an exemplary embodiment of another method 600 for inputting lock commands. Compared to the method 300, the method 600 is generally from the point of view of the lock system. The method 600 can be performed using, for example, an embodiment of the lock system 100.

In a method step or act 610, the lock system detects a data carrier using the data-carrier reader. As a result of detecting the presence of the data carrier, the lock system indicates a first command using the lock output device in a method act 620. While displaying the indicator for the first command, the lock system again detects that the data carrier is within range of the reader in a method act 630. As a result of further detecting the data carrier, the lock system indicates a second command using the lock output device in a method act 640. In a method act 650, the lock system detects a confirmation of the indicated second command. Accordingly, the lock system interprets this to mean that the second command is the command desired by the user. In a method act 660, the lock system selects the second command.

In some embodiments, the user holds the data carrier within range of the reader until the desired command is indicated. Then, to confirm the desired command, the user removes the data carrier from the range of the reader.

In further embodiments, the user places the data carrier within range of the reader for a short period of time (e.g., 0.5 seconds, 1 second, 2 seconds, or another amount of time), removes the data carrier from the reader range for a short period of time, and then returns the data carrier to the reader range. The user repeats this process to cause the lock system to successively indicate different possible commands. To confirm an indicated command, the user holds the data carrier within range of the reader.

In other cases, additional gestures can be used to confirm an indicated command.

In further embodiments of the method 600, the lock system also sends the selected command to another system.

Figure 7:
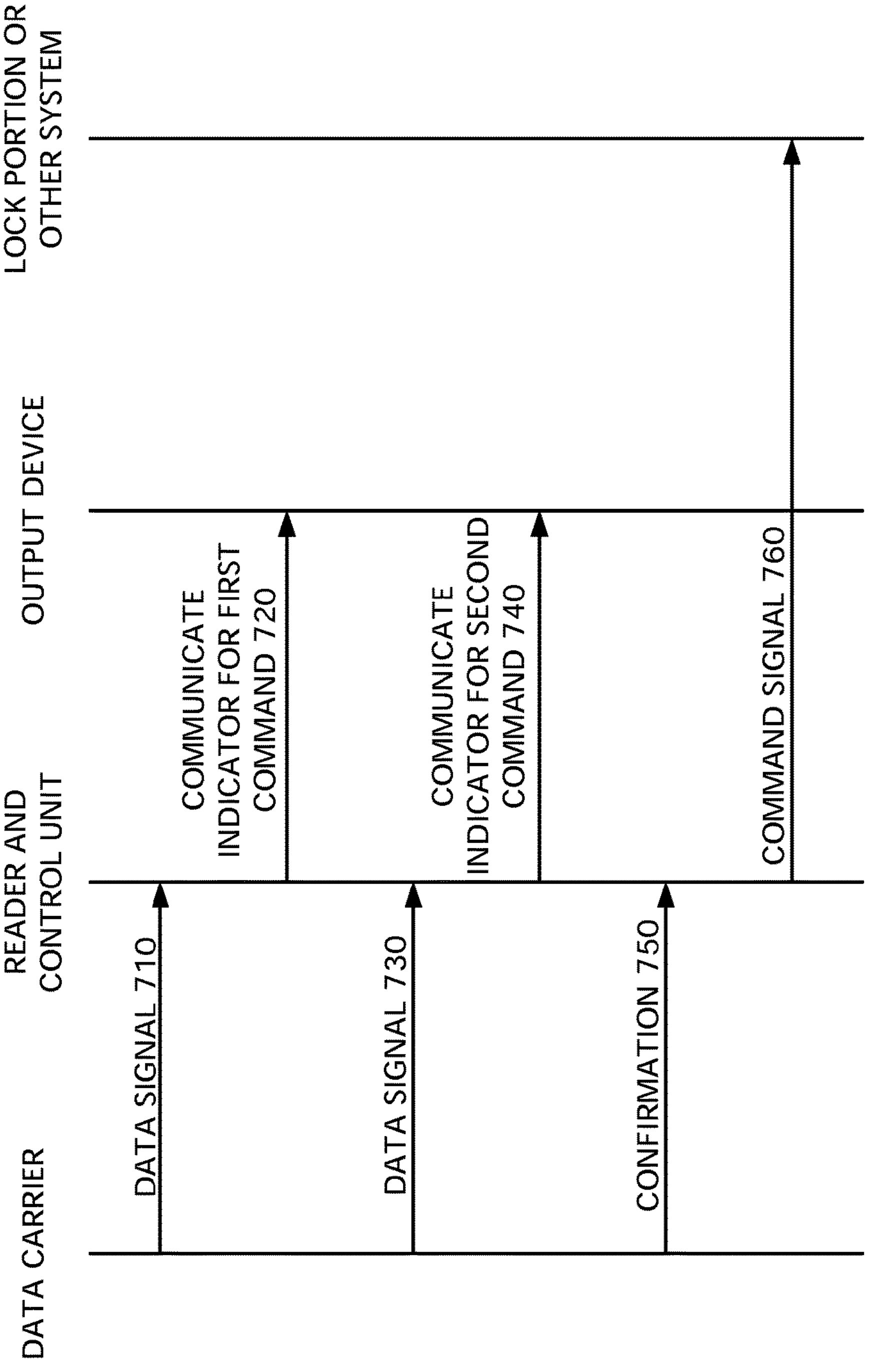
FIG. 7 shows a signal diagram for an exemplary exchange of signals in a lock system.

FIG. 7 shows a signal diagram for an exemplary exchange of signals in a lock system, such as an embodiment of the system 100. A data signal 710 is sent from a data carrier to a reader and a control unit coupled to the reader (e.g., data is read by the reader from the data carrier). As a result of receiving the data signal 710, the control unit sends a signal 720 instructing the lock system's output device to communicate an indicator for a first command. The reader then receives another signal 730 (e.g., the reader reads data from the data carrier), again indicating that the data carrier is within range of the reader. The control unit then sends a signal 740 instructing the output device to display an indicator for a second command. Then, the reader receives a confirmation signal 750. Depending on the embodiment, the confirmation signal 750 could comprise: data read from the data carrier by the reader; an indication that the data carrier is no longer in range of the reader; and/or another form of input. As a result, the control unit sends a command signal 760 to a lock portion or other system to execute the selected second command.

In various embodiments, a data signal is sent by the data carrier in response to a signal that is first sent by the reader (sometimes called an "interrogation signal"). This can be the case if, for example, the data carrier is a passive RFID tag. For clarity, such additional signals sent by the reader are not shown in FIG. 7.

Figure 8:
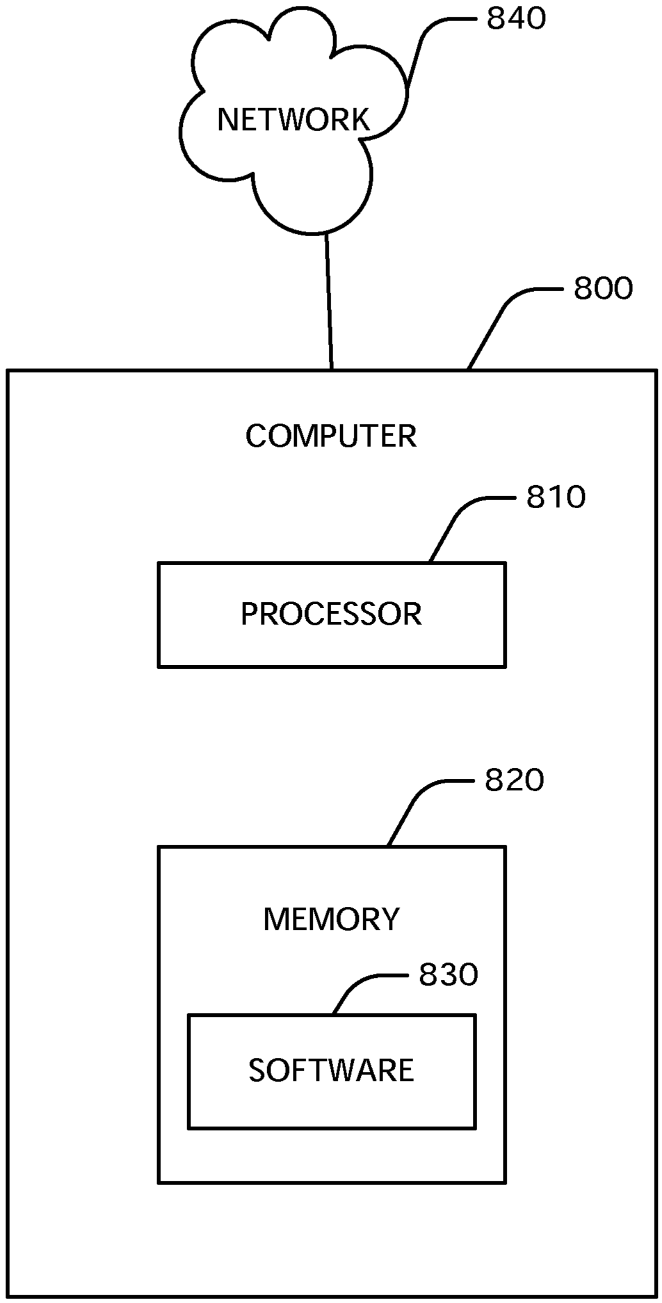
FIG. 8 shows a block diagram of an exemplary embodiment of a computer.

FIG. 8 shows a block diagram of an exemplary embodiment of a computer 800 (e.g., part of a lock system control unit, part of an elevator control system, part of an access control system, part of a reader, part of a database) that can be used with one or more technologies disclosed herein. The computer 800 comprises one or more processors 810. The processor 810 is coupled to a memory 820, which comprises one or more computer readable storage media storing software instructions 830. When executed by the processor 810, the software instructions 830 cause the processor 810 to perform one or more method steps or acts disclosed herein. Further embodiments of the computer 800 can comprise one or more additional components. The computer 800 can be connected to one or more other computers or electronic devices through an input/output component (not shown). In at least some embodiments, the computer 800 can connect to other computers or electronic devices through a network 840. In particular embodiments, the computer 800 works with one or more other computers, which are located locally and/or remotely. One or more of the disclosed methods can thus be performed using a distributed computing system.

In any of the disclosed embodiments, an identification feature can be used. For example, the lock system can compare data read from the data carrier with a list of data for authorized users to determine if the user associated with the data carrier is authorized to perform a given command. Alternatively, the lock system can first require that a user input authorization information, possibly using an additional data carrier.

At least some of the disclosed embodiments can allow additional ways for a user to input a command into an electronic lock. Such embodiments can be helpful to, for example, a user who cannot operate buttons or other types of user interfaces, possibly due to a handicap. Physically touching the electronic lock can also be avoided, which can help avoid the transmission of dirt or disease.

In one non-limiting example, a user lives in a high-rise apartment building. The user's apartment door has an electronic lock, which is contained in a lock housing. Three commands can be input into the lock: lock/unlock the door; call an elevator car to the floor of the user's apartment; and send an elevator car to the building lobby to pick up a guest and bring the guest to the user's floor. The user knows that a guest has just arrived in the lobby, and the user wishes to send the elevator to pick up the guest. The user holds a credit-card-sized RFID card within a few centimeters of the lock housing, which contains an RFID reader. Upon detecting the card, the lock displays a first icon, which is associated with the command to lock/unlock the door. The user continues to hold the card near the reader, so after 1 second, the lock displays a second icon, which is associated with the command to call an elevator car to the user's floor. The user still continues to hold the card near the reader, so after another second, the lock displays a third icon, which is associated with the command to send an elevator car to the building lobby to pick up a guest. This is the user's desired command, so upon seeing the icon, the user moves the RFID card out of range of the lock's reader. The lock interprets this action as meaning that the user wishes to input the command of the third icon. Accordingly, the lock sends this command to the elevator system. The elevator system then sends a car to the lobby to pick up the guest and bring the guest to the user's floor.

In another non-limiting example, a user approaches an electronic door lock with a key fob that contains an RFID tag. The user places the fob in range of the reader, and then moves the key fob away from the lock (so that it is no longer in range of the reader). The user repeats this action several times. Each time the user places the fob in range of the reader and then removes it, the lock displays an indicator for a different command. Once the lock displays an indicator for the fourth command, the user holds the fob within range of the reader for two seconds, thus confirming to the lock that this is the user's desired command. The lock then executes the fourth command.

Although some embodiments of the various methods disclosed herein are described as comprising a certain number of method acts, further embodiments of a given method can comprise more or fewer method acts than are explicitly disclosed herein. In additional embodiments, method acts are performed in an order other than as disclosed herein. In some cases, two or more method acts can be combined into one method act and/or one method act can be divided into two or more method acts.

As used herein, a "user" can be a person, a group of persons, a machine and/or an animal.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An electronic lock method, comprising the steps of:

detecting, upon a data carrier having been held for a predetermined time near a data-carrier reader of an electronic lock, a first presence of the data carrier using the data-carrier reader of the electronic lock;

communicating an indicator for a first command in response to the detection of the first presence of the data carrier using an output device of the electronic lock;

detecting, upon the data carrier having been held for the predetermined time near the data carrier reader, a second presence of the data carrier using the data-carrier reader;

communicating an indicator for a second command in response to the detection of the second presence of the data carrier using the output device;

detecting a confirmation of the second presence of data carrier with the data-carrier reader;

as a result of detecting the confirmation of the data carrier, selecting the second command with a computer-based control unit of the electronic lock, the first command being different from the second command: and sending a command signal to a lock portion or other system to execute the selected second command, wherein:

the first command includes a member selected from a group consisting of: lock a door, unlock a door, call an elevator to pick up a user, open a door for a visitor, and send an elevator to pick up a visitor; and the second command includes a different member selected from the group.

2. The method of claim 1 wherein the confirmation of the data carrier is an absence of the data carrier from the data-carrier reader.

3. The method of claim 1 wherein the confirmation of the data carrier is a continued presence of the data carrier at the data-carrier reader.

4. The method of claim 1 wherein the data carrier includes a radio frequency identification tag.

5. The method of claim 1 wherein the data carrier includes an optical code.

6. The method of claim 1 wherein the second command is one of an elevator installation command, an access control system command, and a lock portion command.

7. The method of claim 1 wherein the first and second presences of the data carrier result from the data carrier being moved out of a range of the data carrier reader and then moved into the range of the data-carrier reader.

8. The method of claim 1 wherein the indicator for the first command is a visual indicator.

9. The method of claim 1 wherein the indicator for the first command is a sound.

10. An electronic lock method, comprising the steps of:

detecting a first presence of a data carrier using a data-carrier reader of an electronic lock;

communicating an indicator for a first command in response to the detection of the first presence using an output device of the electronic lock;

detecting a second presence of the data carrier using the data-carrier reader;

communicating an indicator for a second command in response to the detection of the second presence using the output device;

detecting a confirmation of the data carrier with the data-carrier reader; and as a result of detecting the confirmation of the data carrier, selecting the second command with a computer-based control unit of the electronic lock, the first command being different from the second command;

wherein the first and second presences of the data carrier result from the data carrier being held continuously in a range of the data-carrier reader.

11. An electronic lock comprising:

a data-carrier reader;

an output device; and a computer-based control unit connected to the data-carrier reader and to the output device, the computer-based control unit being programmed to perform a method comprising the steps of, detecting, upon a data carrier having been held for a predetermined time near a data-carrier reader of an electronic lock, a first presence of the data carrier using the data-carrier reader, communicating an indicator for a first electronic lock command in response to detecting the first presence of the data carrier using the output device, detecting, upon the data carrier having been held for the predetermined time near the data carrier reader, a second presence of the data carrier using the data-carrier reader, communicating an indicator for a second electronic lock command in response to detecting the second presence of the data carrier using the output device, detecting a confirmation of the second presence of data carrier with the data-carrier reader, as a result of detecting the confirmation of the data carrier, selecting the second electronic lock command, the first electronic lock command being different from the second electronic lock command; and sending a command signal to a lock portion or other system to execute the selected second command, wherein:

the first command includes a member selected from a group consisting of: lock a door, unlock a door, call an elevator to pick up a user, open a door for a visitor, and send an elevator to pick up a visitor; and the second command includes a different member selected from the group.

12. The electronic lock of claim 11 wherein the computer-based control unit is connected to an elevator system.

13. The electronic lock of claim 11 wherein the computer-based control unit is connected to an access control system.

14. The electronic lock of claim 11 wherein the computer-based control unit is connected to a lock portion of the electronic lock.

15. A non-transitory computer-readable storage media having encoded thereon instructions that, when executed by a processor, cause the processor to perform a method, the method comprising the steps of:

detecting, upon a data carrier having been held for a predetermined time near a data-carrier reader of an electronic lock, a first presence of a data carrier using a data-carrier reader of an electronic lock;

communicating an indicator for a first command in response to the detection of the first presence of the data carrier using an output device of the electronic lock;

detecting, upon the data carrier having been held for the predetermined time near the data carrier reader, a second presence of the data carrier using the data-carrier reader;

communicating an indicator for a second command in response to the detection of the second presence of the data carrier using the output device;

detecting a confirmation of the second presence of data carrier with the data-carrier reader;

as a result of detecting the confirmation of the data carrier, selecting the second command with a computer-based control unit of the electronic lock, the first command being different from the second command; and sending a command signal to a lock portion or other system to execute the selected second command, wherein:

the first command includes a member selected from a group consisting of: lock a door, unlock a door, call an elevator to pick up a user, open a door for a visitor, and send an elevator to pick up a visitor; and the second command includes a different member selected from the group.

16. The non-transitory computer-readable storage media of claim 15 wherein:

the first command includes a member selected from a group consisting of: lock a door, unlock a door, call an elevator to pick up a user, open a door for a visitor, and send an elevator to pick up a visitor; and the second command includes a different member selected from the group.

* * * * *